(12) United States Patent
Heeke

(10) Patent No.: US 6,542,463 B1
(45) Date of Patent: Apr. 1, 2003

(54) METHOD AND ARRANGEMENT FOR CONTROLLING ACCESSES OF NETWORK TERMINAL UNITS TO PREDETERMINED RESOURCES OF A PACKET-ORIENTED COMMUNICATION NETWORK

(75) Inventor: Helmut Heeke, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/086,283

(22) Filed: May 28, 1998

(30) Foreign Application Priority Data

May 28, 1997 (DE) .......................................... 197 22 435

(51) Int. Cl.[7] .............................. H04J 3/16; H04L 12/56
(52) U.S. Cl. .................... 370/230; 370/395.7; 370/463; 370/468
(58) Field of Search ................................ 370/230, 395, 370/420, 442, 461, 462, 463, 468, 252, 395.1, 395.4, 395.41, 395.42, 395.43, 395.7, 395.71, 395.72; 711/109, 110

(56) References Cited

U.S. PATENT DOCUMENTS

| | | | | | |
|---|---|---|---|---|---|
| 5,570,355 | A | * | 10/1996 | Dail et al. ................... | 370/352 |
| 5,648,958 | A | * | 7/1997 | Counterman ................ | 370/458 |
| 5,850,400 | A | * | 12/1998 | Eames et al. ................ | 370/443 |
| 5,917,822 | A | * | 6/1999 | Lyles et al. ................. | 370/395 |
| 5,953,336 | A | * | 9/1999 | Moore et al. ................ | 370/395 |
| 5,966,163 | A | * | 10/1999 | Lin et al. ..................... | 348/12 |
| 6,262,986 | B1 | * | 7/2001 | Oba et al. ..................... | 370/399 |

FOREIGN PATENT DOCUMENTS

| | | |
|---|---|---|
| EP | 0 596 624 | 5/1994 |
| EP | 0 702 472 | 3/1996 |
| EP | 0 774 848 | 5/1997 |

OTHER PUBLICATIONS

International Journal Of Digital And Analog Communication Systems, vol. 6, 55–62 (1993)—Novel Algorithm For Time Division Multiple Access In Broadband ISDN Passive Optical Networks—Glade et al—pp. 53–62.

* cited by examiner

Primary Examiner—Min Jung
(74) Attorney, Agent, or Firm—Morrison & Foerster, LLP

(57) ABSTRACT

In a method and arrangement for controlling accesses of network terminal units to predetermined resources of a packet-oriented communication network, in the context of connection setups, partial communication network resources requested by network terminal units arranged in a packet-oriented communication network are assigned to these units by entering access authorizations into annularly chained memories. By sampling the memories, the access to the assigned partial communication network resources is granted to the network terminal units in a manner corresponding to the entered access authorizations. Advantageously, the communication network resources are distributed to arbitrarily many network terminal units.

9 Claims, 2 Drawing Sheets

METHOD AND ARRANGEMENT FOR CONTROLLING ACCESSES OF NETWORK TERMINAL UNITS TO PREDETERMINED RESOURCES OF A PACKET-ORIENTED COMMUNICATION NETWORK

BACKGROUND OF THE INVENTION

In current communication networks designed according to the asynchronous transfer mode (ATM), in particular subscriber terminal networks and feeder networks (ACCESS networks, e.g. passive optical networks or fiber coax networks), the available network resources are partitioned to network terminal units connected to the communication network, or are partitioned to the communication terminal apparatuses connected to the network terminal units. The access of the network terminal units or communication terminal devices to the transmission medium used in common (e.g. light waveguides or radio channels) is controlled by an algorithm that is normally realized by hardware, given a high transmission speed and a plurality of connected communication terminal devices, the algorithm granting access authorization to a network terminal unit requesting communication network resources.

In already-installed subscriber terminal networks, for each network terminal unit a timer or counter is realized, for example in a network control unit connected with each network terminal unit, the timer being started in the context of connection setups introduced by the network terminal units. A timer runs out or the counter reaches a predetermined value, as soon as a new data packet is filled with useful data in a relevant network terminal unit and is intermediately stored for data transmission in a buffer memory likewise realized in the network terminal unit. The dimensioning of the counter or the time until the running out of a timer occurs dependent on the data transmission rates respectively reserved during the connection setups. A signaling signal that indicates the running out of a timer represents a request for a transmission authorization on the transmission medium used in common. The request is individual to the network terminal unit and is stored sequentially in a memory (e.g., a FIFO memory) that is realized in the network control unit and is used in common by all the network terminal units. The stored transmission authorizations are read out from this memory and are transmitted, as the actual transmission authorization, to the network terminal units or communication terminal apparatuses, which thus receive access to the transmission medium. Two timers can, for example, run out at the same time, i.e. two isochronous access authorizations would have to be stored and controlled. Since, however, two isochronous accesses are not possible, one of the two access authorizations is delayed until the current access is terminated. This delaying is designated "cell delay variation." Given running out of several timers at the same time, the value of the cell delay variation is correspondingly increased.

In addition, it has already been proposed that the transmission authorizations requested by the network terminal units be acquired and stored directly by means of a central control unit, and that the requested transmission authorizations be uniformly distributed on the transmission medium used in common.

The methods described above for the assigning of transmission authorizations can be realized only for a limited number of network terminal units or communication terminal apparatuses. In addition, the delay times in which the network terminal units receive the access to the transmission medium comprise statistical fluctuations or a differing cell delay variation. The value of the cell delay variation depends on the data transmission rates of all connections set up, and becomes very large when the overall data transmission rate of the transmission medium used in common approximates the value 100%. The large delay times cause an overflow of buffer memories, and thus an extreme increase in the error rate in the data transmission, which results in a break off of set-up connections, In accordance with protocol.

SUMMARY OF THE INVENTION

It is an object of the invention to optimize the use of predetermined switching-oriented and transmission-oriented resources in a packet-oriented communication network.

According to the apparatus and method of the present invention, accesses of network terminal units to predetermined resources of a packet-oriented communication network are controlled. Annularly chained memories are allocated to the network terminal units, the chained memories being sampled cyclically and which represent predetermined partial communication network resources. In the context of connection setups introduced by the network terminal units, requested partial communication network resources are assigned to the network terminal units by entering access authorizations into the annularly chained memories. Given a sampling of an annularly chained memory, access is currently granted to the assigned partial communication network resources corresponding to the entered access authorization of the relevant network terminal unit.

An important aspect of the method of the invention for controlling accesses of network terminal units to predetermined resources of a packet-oriented communication network is in the allocation of annularly chained memories to the network terminal units, whereby the successive memories, which can be sampled cyclically, represent predetermined partial communication network resources. In the context of connection setups introduced by the network terminal units, requested partial communication network resources are allocated to the network terminal units by entering access authorizations into the annularly chained memories. When an annularly chained memory is sampled, access is currently granted to the allocated partial communication network resources, corresponding to the entered access authorization of the relevant network terminal unit.

The essential advantage of the method of the invention is that the predetermined resources of a packet-oriented communication network can be arbitrarily distributed to many network terminal units arranged therein, whereby the packet-oriented communication networks, e.g. packet networks such as ATM networks, however also comprise local packet-oriented communication networks (e.g., bus networks, ring networks or star networks). In addition, these predetermined resources (e.g., a transmission rate of 622 Mbit/s or 2.6 Gbit/s) can be assigned to a single network terminal unit as needed.

Advantageously, given a signaling from the network terminal units that modifies the scope of the requested partial communication network resources, or given a signaling from the packet-oriented communication network that indicates a modification of the availability of the predetermined resources, the allocation of the requested partial communication resources is carried out again. By means of this advantageous construction, current changes in the requested partial communication network resources are taken into account, so that the available predetermined resources of the packet-oriented communication network are distributed optimally to the network terminal units respectively currently containing or switching a connection.

According to a further advantageous construction, further annularly chained memories, constructed corresponding to the annularly chained memories, are allocated to the network terminal units, whereby the access authorizations are entered for the first time into the annularly chained memories or further annularly chained memories, and the controlling of accesses of network terminal units is currently controlled by these memories. Upon each change of access authorizations, all access authorizations are determined anew, and are entered into the memory not currently being used for controlling accesses. After this entering, after the current granting of an access these memories are used for controlling accesses. By means of this advantageous construction, an entering of access authorizations into the annularly chained memories is possible during running operation. Thus, during the sampling of the annularly chained memories a new allocation of access authorizations to the annularly chained memories (e.g., initiated by a connection setup of a network terminal unit) is determined in the background, i.e. in parallel, and subsequently the determined access authorizations are entered, during operation, into the chained memories respectively not currently used for controlling accesses. In this way, a rapid and effective controlling of access authorizations can be realized.

Advantageously, in the context of the connection setup the delay of the accesses of the network terminal units to the allocated partial communication network resources is determined by the occupation of the annularly chained memories. During access to the allocated partial communication network resources, the determined delays are not exceeded. By means of this advantageous construction, the delay of the accesses of the network terminal units to the transmission medium used in common (cell delay variation) is known already during the connection setup phase, and is guaranteed even given a full-capacity utilization of the predetermined resources of the packet-oriented communication network for each connected network terminal unit, i.e., the determined delays are thus maximum delays of the packets to be transmitted, which are not exceeded.

According to a further advantageous construction, the access authorizations of the network terminal units are entered into the annularly chained memories in such a way that the accesses to the allocated partial communication network resources are optimized according to predetermined criteria. Such a predetermined criterion presents for example the minimum delay of the accesses of the network terminal units to the allocated partial communication network resources. By means of this advantageous constructive feature, connections can be realized with a minimum delay of the accesses of the corresponding network terminal units, i.e. with a minimum cell delay variation, which are suitable in particular for the transmission of time-critical data (e.g., speech or video data), whereby the optimized delays are not exceeded.

The packet-oriented communication network is advantageously realized by means of a communication network designed according to the asynchronous transfer mode (ATM), and the predetermined resources of the packet-oriented communication network are advantageously represented by the transmission capacity of the wire-bound, optical, or wireless transmission paths in the feeder network of the packet-oriented communication network. Such wire-bound, optical or wireless transmission paths are, for example, realized between a network control unit that carries out the method of the invention and the packet-oriented communication network, or between the network control unit and the network terminal units connected thereto (also designated subscriber terminal network).

Further advantageous constructions of the method of the invention, as well as a network control unit for controlling accesses to predetermined resources of a packet-oriented communication network, are also provided.

In the following, the method of the invention for controlling accesses of network terminal units to predetermined resources of a packet-oriented communication network are explained in more detail on the basis of two block switching diagrams.

DESCRIPTION OF THE PREFERRED EMBODIMENTS

Figure 1:
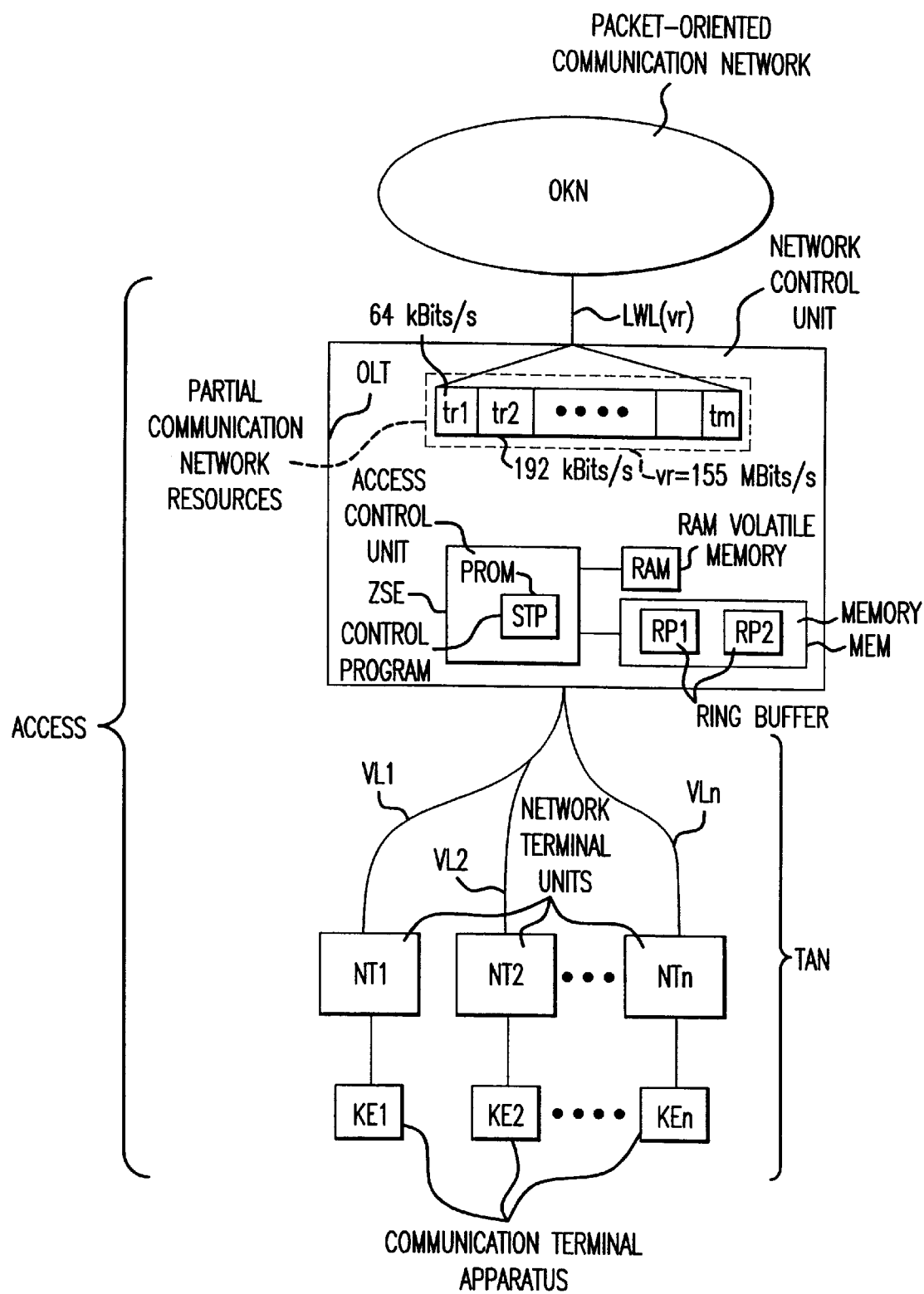
FIG. 1 thereby shows a network control unit connected, via a subscriber terminal network, with several network terminal units and with a higher-level packet-oriented communication network.

FIG. 1 shows a network control unit OLT, which is connected with a packet-oriented communication network OKN via predetermined resources vr. In this exemplary embodiment, the packet-oriented communication network OKN is realized by a communication network designed according to the asynchronous transfer mode (ATM). The predetermined resources vr, with a data transmission rate of e.g. 155 MBit/s, are realized by a light waveguide transmission, whereby the network control unit OLT is connected to the communication network OKN (which is designed according to ATM) for example via a single light waveguide LWL. Several network terminal units NT1 . . . n are connected to the network control unit OLT via terminal lines VL1 . . . n that realize a subscriber terminal network TAN. The network control unit OLT and the subscriber terminal network TAN form the feeder network ACCESS for the ATM-oriented communication network OKN. An access control unit ZSE, which controls the accesses of the network terminal units NT1 . . . n to the feeder network ACCESS, is arranged in the network control unit OLT, said control unit being connected to a volatile memory RAM. Each network terminal unit NT1 . . . n can be connected with at least one communication terminal apparatus KE. In this exemplary embodiment a first communication terminal apparatus KE1 is connected with the first network terminal unit NT1, and a second communication terminal apparatus KE2 is connected with the second network terminal unit NT2. The first communication terminal apparatus KE1 represents a digital telephone terminal apparatus, e.g. an ISDN-oriented telephone. When, for example, the telephone handset is picked up, a corresponding connection setup message is sent to the first network terminal unit NT1. From the first network terminal unit NT1, a connection setup to the network control unit OLT, and thereby to the higher-level ATM-oriented communication network OKN, is introduced in accordance with a protocol. In the context of the connection setup, a data transmission rate of 64 KBit/s is reserved for example for the communication terminal apparatus KE1 allocated to the first network terminal unit NT1.

The time-critical data or speech data transmitted during a telephone conversation from the first communication terminal apparatus KE1 to the first network terminal unit NT1 are stored in an intermediate memory (not shown) arranged in the first network terminal unit NT1. In order to guarantee a transmission of the time-critical data in real time, as well as to prevent an overflow of the intermediate memory, access to the predetermined resources vr (which are used in common by all network terminal units NT1 . . . n) of the feeder network ACCESS or of the ATM-oriented communication network OKN must be granted, in corresponding regular time intervals, by means of the access control unit ZSE (arranged in the network control unit OLT) of the first network terminal unit NT1.

Figure 2:
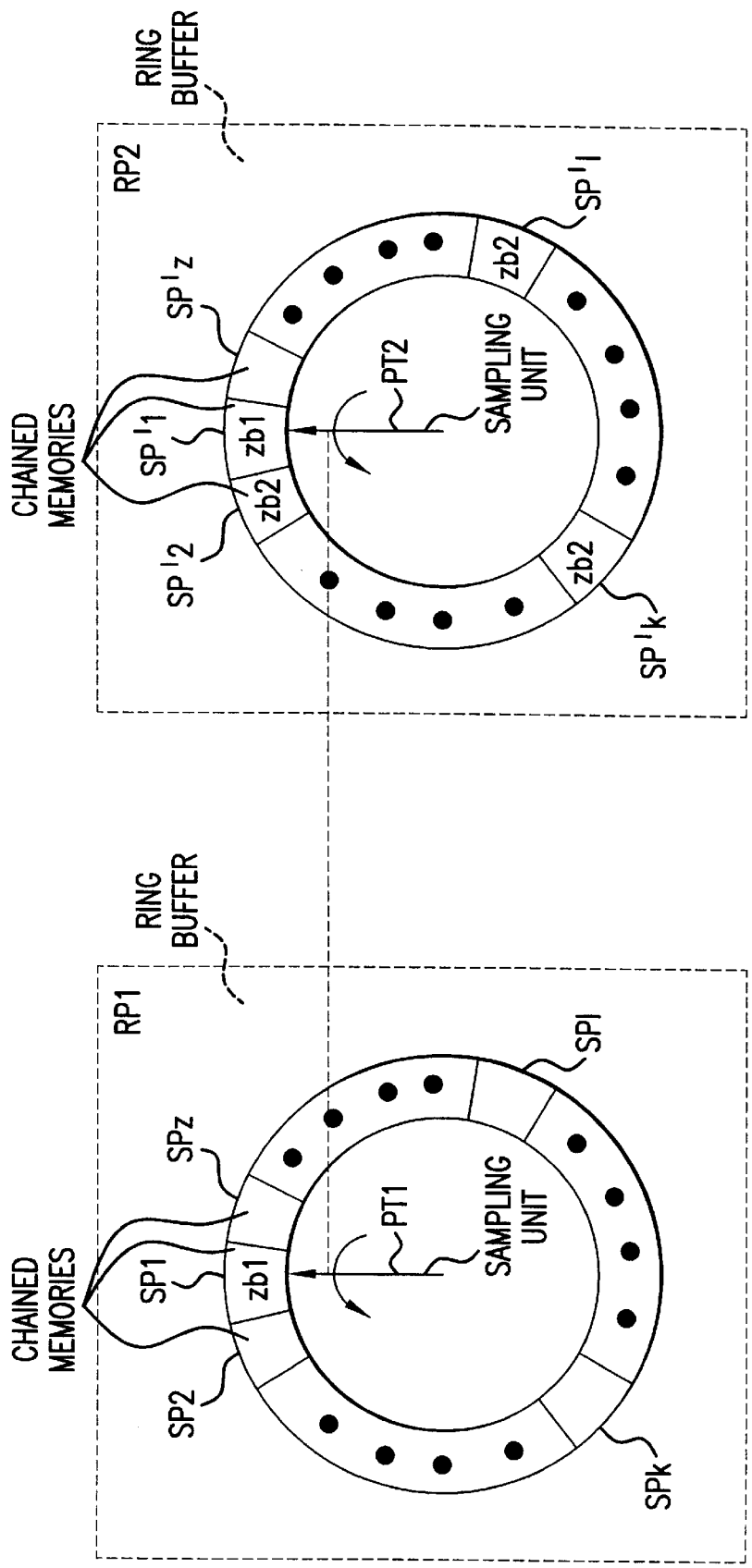
FIG. 2 shows a representation of two ring buffers realized by means of annularly chained memories, with access authorizations of network terminal units entered therein.

The principle of the controlling according to the invention of accesses to the predetermined resources vr of the light waveguide LWL is shown in FIG. 2. FIG. 2 shows a first ring buffer RP1, formed by annularly chained memories SP1 . . . z, as well as further annularly chained memories SP'1 . . . z, which form a second ring buffer RP2, whereby the two ring buffers RP1, RP2 (see FIG. 1) arranged in a memory MEM connected with the access control unit ZSE, are structured identically, i.e., are constructed from an identical number of annularly chained memories SP1 . . . z, SP'1 . . . z. The annularly chained memories SP1 . . . z, SP'1 . . . z are each sampled successively and cyclically by means of a sampling unit PT1,2, whereby the first sampler PT1 samples the first ring buffer RP1 and the second sampler PT2 samples the second ring buffer RP2. The two ring buffers RP1,2, or the annularly chained memories SP1 . . . z, SP'1 . . . z arranged therein, can for example be realized by two memory modules, each with 4K×8 bits memory volume (not shown), and the two samplers PT1,2 can each be realized by a digital counter (not shown) with a 12-bit word width and with a unit connected thereto (not shown) for reading out from the memories SP1 . . . z, SP'1 . . . z. The two samplers PT1, PT2 are logically coupled with one another (indicated by broken lines); i.e., at the same time, the same memories SP1 . . . z, SP'1 . . . z, arranged identically in the ring buffers RP1, RP2, are respectively sampled, whereby, however, only the memories SP1 . . . z, SP'1 . . . z of a ring buffer RP1,2 are read out, and the access to the feeder network ACCESS is granted on the basis of the items of information read out. The sampling speed is thereby determined by the scope of the resources or the overall data transmission rate vr of the light waveguide LWL, whereby the annularly chained memories SP1 . . . z, SP'1 . . . z are sampled cyclically with each ATM-specific cell pulse. The annularly chained memories, SP1 . . . z, SP'1 . . . z, represent predetermined partial communication network resources tr1 . . . n of the light waveguide LWL, which can be allocated to the individual network terminal units NT1 . . . n or, respectively, communication terminal apparatuses KE1, KE2. The allocation according to the invention of the partial communication network resources tr1 . . n to the network terminal units NA1 . . . n takes place by entering at least one identifier that is specific to the network terminal unit or at least one access authorization zb1 . . . n that identifies a network terminal unit NT1 . . . n, into one of the annularly chained memories SP1 . . . z, SP'. . . z. Dependent on the number of the annularly chained memories SP1 . . . z, SP'1 . . . z arranged respectively in a ring buffer RP1, RP2, and on the sampling speed of the samplers PT1,2, it is possible to achieve a basic granularity: of the partial communication network resources tr1 . . . n that can be allocated to the network terminal units NT1 . . . n, or to communication terminal apparatuses KE1, KE2;—or of the subscriber data transmission rates that can be allocated thereto. In this exemplary embodiment, the number of annularly chained memories SP1 . . . z, SP'1 . . . z that respectively form a ring buffer RP1,2 is for example dimensioned in such a way that, given an overall data transmission rate of the light waveguide LWL of vr=155 MBit/s, the same memory SP1 . . . z, SP'1 . . . z is sampled by the rotating sampler PT1, PT2 every 48×125 $\mu$s=6 ms. In the sampling of a memory SP1 . . . z, SP'1 . . . z, a possible entered access authorization zb1 . . . z is read out, and the corresponding network terminal unit NT1 . . . n grants the access to the feeder network ACCESS. By means of the cyclical sampling, the access authorization zb1 . . . n to the feeder network ACCESS is for example granted every 6 ms to a network terminal unit NT . . . n allocated to a memory Sp1 . . . z, SP'1 . . . z, which, at a useful data transmission rate of 48 bytes per ATM cell, corresponds to a continuous data transmission rate of 64 KBit/s. In the following, the assignment and entering of access authorizations zb1 . . . n into the annularly chained memories SP1 . . . a, SP'1 . . . z is explained in more detail.

As already explained, the first ISDN-oriented communication terminal apparatus KE1 transmits a connection setup request for the transmission of speech data to the corresponding first network terminal unit NT1. The first network terminal unit NT1 introduces a corresponding connection setup to the network control unit OLT, according to the ATM protocol. According to the method of the invention for controlling accesses, realized in the network control unit OLT, a suitable free memory (here SP1) is determined in the ring buffer currently sampled or read from (here RP1), and the access authorization zb1, allocated to the first network terminal unit NT1, or to the first communication terminal apparatus KE1 connected thereto, is entered into the determined memory SP1, by which the partial communication network resource tr1 (here a data transmission rate of 64 KBit) represented by the memory SP1 is assigned to the first network terminal unit NT1.

The algorithm for the determination or assignment, as well as for the entering of the determined access authorizations zb1 . . . n into the annularly chained memories SP1 . . . z, SP'1 . . . z of the ring buffer RP1, RP2 currently not being sampled, is advantageously realized by a control program STP arranged in the access control unit ZSE or, respectively, in a program memory PROM. In the volatile memory RAM allocated to the access control unit ZSE, the momentary occupation of the currently sampled memories Sp1 . . . z, SP'1 . . . z is stored, i.e., the volatile memory RAM always contains a copy of the currently sampled ring buffer RP1,2. Upon each connection setup according to the ATM protocol introduced by a network terminal unit NT1 . . . n, or given a signaling for a change in bit rate, the allocation of partial communication network resources tr1 . . . n to the annularly chained memories SP1 . . . z, SP'1 . . . z is newly determined or calculated, by means of the access control unit ZSE with the aid of the copy (stored in the volatile memory RAM) of the currently sampled ring buffer RP1,2, and subsequently the access authorizations zb1 . . . n that are determined and newly allocated to the annularly chained memories SP1 . . . z, SP'1 . . . z are entered into the annularly chained memories (here e.g. SP1 . . . z) currently not sampled. During the transmission of the currently determined access authorizations zb1 . . . n from the volatile memory RAM into the ring buffer currently not sampled (here RP1), the annularly chained memories SP'1 . . . z of the other ring buffer (here RP2) are further sampled, so that operation without disturbances, i.e. disturbance-free updating of the access authorizations zb1 . . . n, is enabled. After the transmission of the access authorizations zb1 . . . n from the volatile memory RAM into the annularly chained memories SP1 . . .

z of the ring buffer RP1 not currently sampled, these authorizations are sampled by the sampler PT1, beginning at a defined switchover time, and are currently read out, in place of the annularly chained memories SP'1 . . . z of the second ring buffer RP2. The switchover time is thereby defined in such a way that there occurs no overflow of the intermediate memories arranged in the network terminal units NT1 . . . n. For example, the switchover time can also be determined by the control program STP realized in the program memory PROM, and the sampling switchover can be initiated by the access control unit ZSE, with the aid of the determined time point.

Since in this exemplary embodiment it is still the case that no connection setups were introduced by the other network terminal units NT2 . . . n, no further access authorizations zb2 . . . n are entered into the remaining annularly chained memories SP2 . . . z arranged in the first ring buffer RP1. Alternatively, further items of information can be entered into the named unused memories SP2 . . . z, such as, for example: "no one may transmit" messages or items of control information for system organization and system maintenance.

According to the access authorization zb1, shown in FIG. 2 and stored in the first ring buffer RP1, the first memory SP1 is sampled every 6 ms by the sampler PT1 and is read out, by which the access to the feeder network ACCESS is granted to the first network unit NT1 allocated to the first memory SP1 or, respectively, access is granted to the first communication terminal apparatus KE1 connected thereto. By this, access is granted to the first network terminal unit NT1 when 48 bytes of speech data volume are transmitted to the first network terminal unit NT1 by the first communication terminal apparatus KE1, and are inserted into an ATM cell as useful data.

During a currently existing connection between the first communication terminal apparatus KE1 and the network control unit OLT, a further connection setup request, for the transmission of e.g. video data, is communicated to the network control unit OLT, e.g. by the second communication terminal apparatus KE2 (e.g., a multimedia communication terminal apparatus). Correspondingly, the second network terminal unit NT2 introduces a connection setup for a data transmission at a higher bit rate (here e.g. 192 KBit/s) to the network control unit OLT, according to the ATM protocol. According to the method of the invention realized in the network control unit OLT, suitable free annularly chained memories SP2 . . . z for the assignment of partial communication network resources tr2 (here 192 KBits) are determined by means of the control program STP realized in the access control unit ZSE and by the current allocation of access authorizations zb1, stored in the volatile memory RAM. After the new calculation and allocation of the access authorizations zb1,2, the content of the volatile memory RAM, i.e. the current allocation of the partial communication network resources tr1,2 requested by the communication terminal apparatuses KE1, KE2, is transmitted into the annularly chained memories SP'1 . . . z of the second ring buffer RP2 currently not sampled, and is stored. After the termination of the data transmission, in place of the first ring buffer RP1, the annularly chained memories SP'1 . . . z of the second ring buffer RP2 are sampled by the second sampler PT2 and read out, by which the network terminal units NT1 . . . n or, respectively, communication terminal apparatuses KE1, KE2 obtain access to the feeder network ACCESS according to the newly calculated allocation of the access authorizations zb1,2. The newly calculated access authorizations zb1,2, or, respectively, the partial communication network resources tr1,2 (here 64 KBit/s and 192 KBits) allocated to the first and second communication terminal apparatus KE1, KE2, are represented in FIG. 2 by the occupation of the annularly chained memories SP'1 . . . z of the second ring buffer RP2. The first memory SP'1, sampled cyclically every 6 ms, is allocated to the first network terminal unit NT1 or, respectively, the first communication terminal apparatus KE1, as before the new calculation of the access authorizations zb1,2. By this, a data transmission rate of 64 KBit/s is provided and guaranteed to the first communication terminal apparatus KE1.

For the second communication terminal apparatus KE2 or for the second network terminal unit NT2, an access authorization zb2 is respectively entered into three annularly chained memories SP'2,k,l arranged uniformly in the second ring buffer RP2. By means of the uniform arrangement, the three memories SP'2,k,l are cyclically sampled in constant time intervals of 2 ms, whereby access to the feeder network ACCESS is granted every 2 ms to the second network terminal unit NT2 or, respectively, to the second communication terminal apparatus KE2, and a data transmission rate of 3×64 bits=192 KBits is thus assigned and guaranteed.

By means of the optimum occupation (shown in FIG. 2) of the annularly chained memories SP'1,2,k,l, arranged in the second ring buffer RP2, with assigned access authorizations zb1,2, no statistical fluctuations occur in the time intervals in which access to the feeder network ACCESS is granted to the network terminal units NT1,2 transmitting the data. The value of the cell delay variation is zero; i.e., access to data-transmitting network terminal units NT1,2 is granted when an ATM cell is filled with useful data and is stored in the intermediate memory of the relevant network terminal unit NT1,2. The method of the invention specified in the exemplary embodiment, for allocation of access authorizations zb1 . . . n has the advantage that already during the setup of a requested connection the value of the cell delay variation is determined once and is known without additional measurement means. The connection is finally set up or terminated dependent on the determined value. Given a data transmission via a connection set up in this way, the determined value of the cell delay variation is guaranteed independent of the load on the network control unit OLT, i.e., the cell delay variation is not exceeded. This means that the assigned partial communication network resources tr1 . . . n are provided to the corresponding network terminal units NT . . . n in unlimited fashion.

In subscriber terminal networks TAN with a large number of subscribers or network terminal units NT1 . . . n connected thereto, the case sometimes occurs that in a further connection setup requested by a network terminal unit NT1 . . . n, the memories SP1 . . . z, SP'1 . . . z determined for an optimal allocation of access authorizations zb1 . . . n are already occupied with access authorizations zb1 . . . n of other network terminal units NT . . . n. For these cases, the control program STP that runs in the access control unit ZSE of the network control unit OLT can be optimized according to different criteria, e.g. in such a way that the values of the cell delay variation for the respectively requested connections are minimal. The allocation algorithm realized by the control program STP can for example be constructed in such a way that in place of the memory SP1 . . . z, SP'1 . . . z, which was determined but already occupied with another access authorization zb1 . . . n, the free memory SP1 . . . z, SP'1 . . . z closest to the occupied memory SP1 . . . z, SP'1 . . . z is determined, and the access authorization zb1 . . . n of the network terminal unit requesting a connection setup is stored in this memory. Due to the non-optimum assignment of the access authorization zb1 . . . n, the value of the cell delay variation for this connection is not equal to zero. However, the value of the cell delay variation is advantageously determined during the connection setup and is known, and is not exceeded even during a full utilization of the resources of the feeder network ACCESS. In addition, for example the assignment algorithm is constructed in such a way that given an unburdening of the resources of the feeder network ACCESS, i.e., given a tearing down of existing connections, the allocation of current access authorizations zb1 . . . n is newly calculated, and thus connections transmitting data with a showing cell delay variation with respect to the access to the feeder network ACCESS are optimized, i.e. the value of the cell delay variation is minimized.

Although various minor changes and modifications might be proposed by those skilled in the art, it will be understood that our wish is to include within the claims of the patent warranted hereon all such changes and modifications as reasonably come within our contribution to the art.

I claim as my invention:

1. A method for controlling accesses of network terminal units to given resources of a packet-oriented communication network, comprising the steps of:

allocating a first and at least a second ring buffer, each respectively comprising annularly chained memories, to the network terminal units, said chained memories being successively cyclically readable;

initially for at least one connection setup initiated by at least one of the network terminal units, allocating respectively requested partial resources to the at least one network terminal unit by entry of corresponding access authorizations into the annularly chained memories of either the first or the second ring buffer so that access of the respective network terminal units onto the resources of the communication network is controlled according to the respectively read access authorizations by means of cyclical sampling of the memories of the ring buffer comprising the entered access authorizations;

given every change of the corresponding access authorizations or given a further request or release of partial resources by at least one of the network terminal units, determining anew the access authorizations and entering updated access authorizations into the annularly chained memories of the first or second ring buffer not currently used for the control of the access; and following the entering, controlling the access onto the resources of the communication network according to the respectively read access authorizations by means of the cyclical sampling of the updated first or second ring buffer.

2. The method according to claim 1, including the further steps of:

in the connection setup, determining a delay of the accesses of the network terminal units to the allocated partial communication network resources by occupation of the annularly chained memories; and not exceeding the determined delays during access to the allocated partial communication network resources.

3. The method according to claim 1, wherein without an entered access authorization, the annularly chained memories are occupied with a further item of information not related to the access authorizations and which is individual to the network terminal unit.

4. The method according to claim 1, wherein the access authorizations of the network terminal units are entered into the annularly chained memories in such a way that accesses to the allocated partial communication network resources are optimized according to predetermined criteria.

5. The method according to claim 4, wherein the predetermined criterion represents a minimum delay of the accesses of the network units to the allocated partial communication network resources.

6. The method according to claim 1, wherein the annularly chained memories are sampled with a packet pulse of the packet-oriented communication network, and the access authorizations are read out.

7. The method according to claim 1, wherein a number of the annularly chained memories is determined dependent on a predetermined scope of the resources of the packet-oriented communication network and on an arbitrarily predeterminable scope of the partial communication network resources.

8. The method according to claim 1, wherein the packet-oriented communication network is realized by a communication network designed according to an asynchronous transfer mode.

9. The method according to claim 1, wherein the predetermined resources of the packet-oriented communication network are represented by transmission capacity of at least one of wire-bound, optical, and wireless transmission paths in a feeder network of the packet-oriented communication network.

* * * * *